J. Wood,
Stalk Chopper.
No. 111,709.   Patented Feb. 7, 1871.

Witnesses:   John Wood, Inventor,
              by Munn & Co.
              his Attorneys.

United States Patent Office.

JOHN WOOD, OF PELLA, IOWA.

Letters Patent No. 111,709, dated February 7, 1871.

IMPROVEMENT IN MACHINES FOR CUTTING CORN-STALKS.

The Schedule referred to in these Letters Patent and making part of the same.

*To all to whom it may concern:*

Be it known that I, JOHN WOOD, of Pella, in the county of Marion and State of Iowa, have invented a new and improved Machine for Cutting Corn-Stalks; and I do hereby declare the following to be a full, clear, and exact description of the same, reference being had to the accompanying drawing making a part of this specification, in which—

Figure 1:
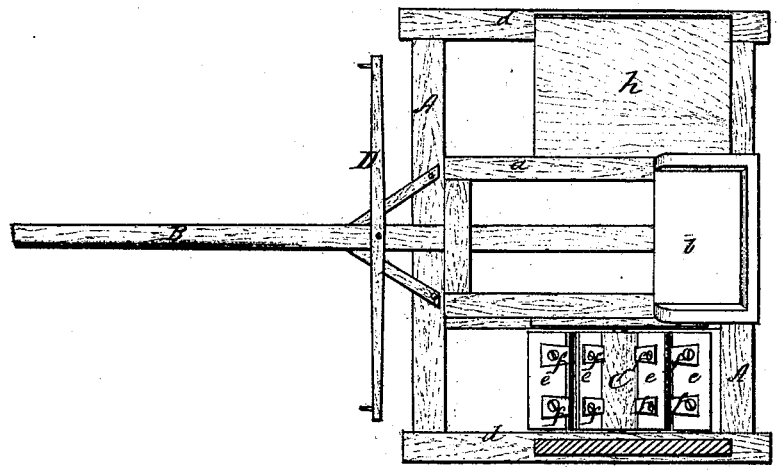
Figure 2:
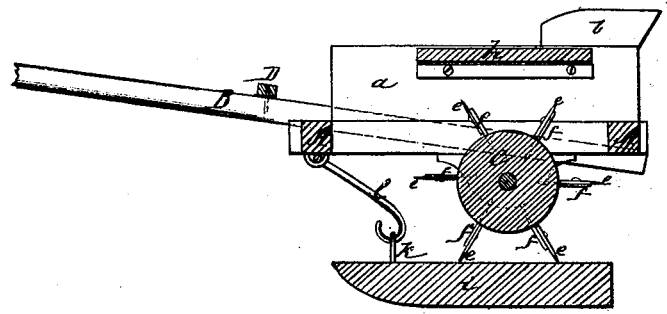

Figure 1 is a plan view, with one of the boxes which cover the cutters removed, and Figure 2 is a sectional elevation.

The object of this invention is to cut up corn-stalks and prepare corn land for the plow.

This invention is an improvement in machines for chopping corn-stalks, and has particular reference to improvement on the machine for this purpose for which Letters Patent of the United States were granted to F. M. Green, August 24, 1858.

In the drawing—

A is the frame.

$a$, a central box, on the top of which, at the rear end, is the driver's seat $b$.

$c$ is one of the wheels, of which there are two, to be made of wood or iron, one at each side of the machine, mounted in boxes attached to the under sides of the cross-pieces $d$, and at a distance apart such that each wheel may roll over a separate row of stalks and the machine cut two rows at once.

$e$ are the knives, which are set lengthwise of the wheels and attached to arms $f$ projecting radially therefrom. I recommend six knives to each wheel.

Boxes $h$ are placed over the wheels to protect them and prevent anything from falling into them.

These wheels effectually clear the ground of standing corn-stalks. For preventing their rotation and preserving them from injury while the machine is moving toward the place where it is to be used or from the same, there are provided wooden drags $i$, which are to be placed beneath the wheels.

The drags are provided with staples $k$ at their front ends, and to the forward side piece of the frame A are hung hooks $l$, which are to be inserted in the staples $k$. By this means the drags are connected with the frame.

When not in use the drags are carried in the box $a$, under the seat, where they are always at hand and help make up the weight necessary to the efficient action of the knives.

B is the tongue for attaching two horses, and

C is the double-tree.

Having thus described my invention,

What I claim as new, and desire to secure by Letters Patent, is—

The improved stalk-cutter, consisting of the frame A $d$ $h$, provided with the central box $a$ to receive the shoes or drags $i$, and with hooks $l$ for attaching the shoes beneath the cutting-cylinder, and the separate or independent cylinders or wheels $c$, which are provided with knives $e$ secured to arms $f$, and arranged to rotate at the sides of the frame with a space between them, all as shown and described and for the purpose set forth.

JOHN WOOD.

Witnesses:
WM. A. FRUSH,
W. H. BARKER.